(No Model.) 2 Sheets—Sheet 1.
B. C. WAITE.
COMBINED FRICTIONAL AND POSITIVE CLUTCH.
No. 565,190. Patented Aug. 4, 1896.
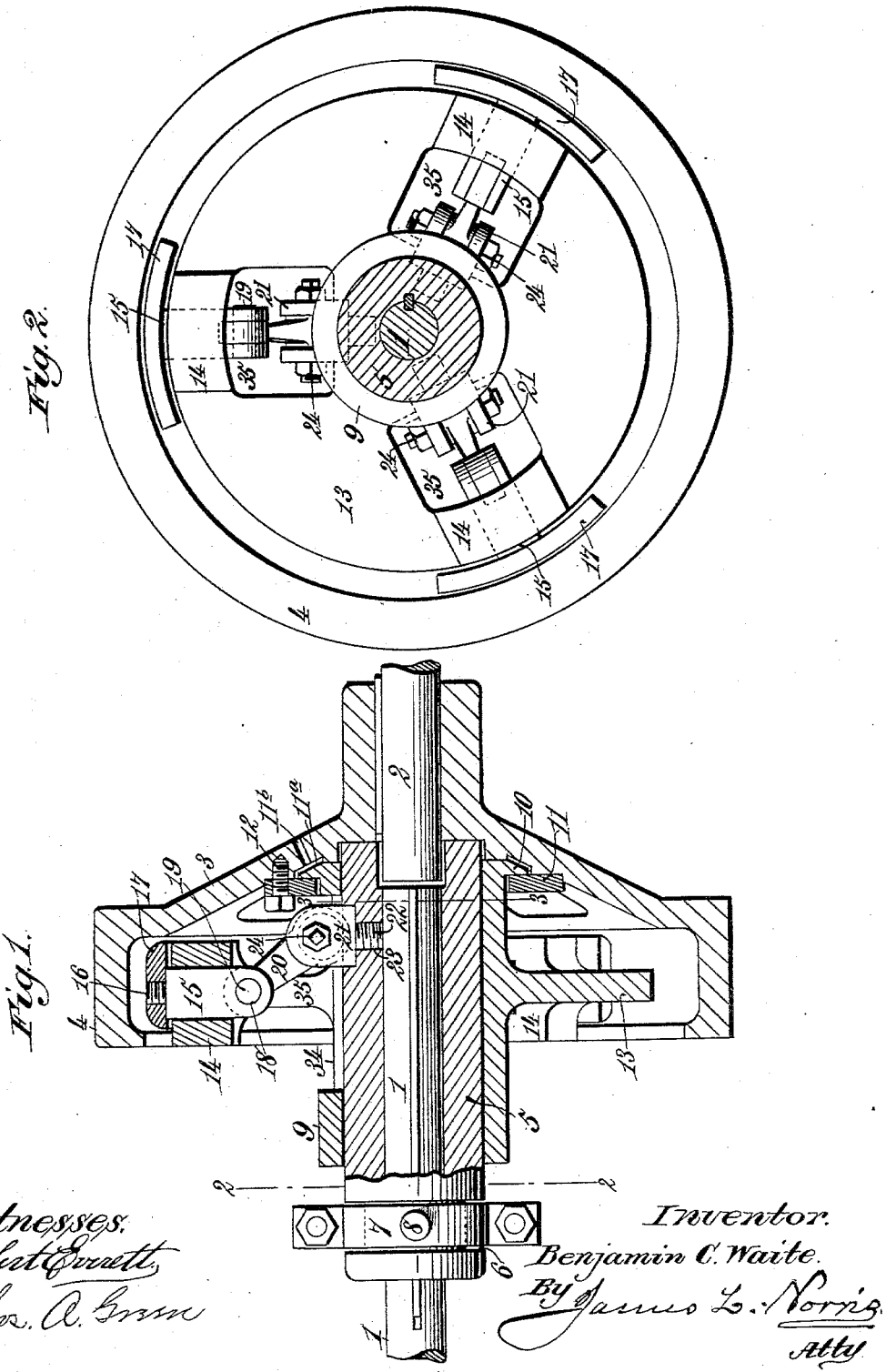
Witnesses.
Inventor.
Benjamin C. Waite.
By James L. Norris
Atty (No Model.) 2 Sheets—Sheet 2.
B. C. WAITE.
COMBINED FRICTIONAL AND POSITIVE CLUTCH.
No. 565,190. Patented Aug. 4, 1896.
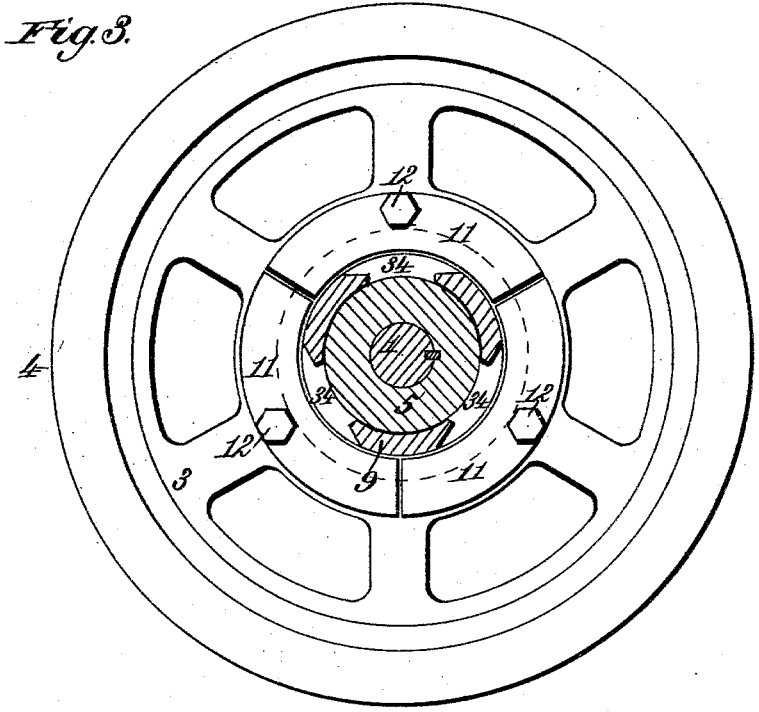
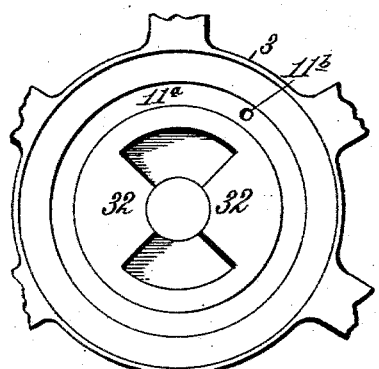
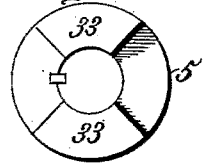
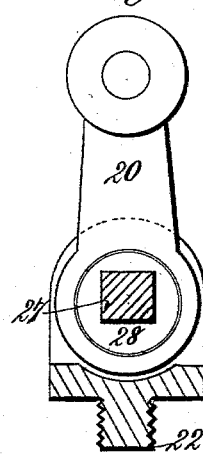
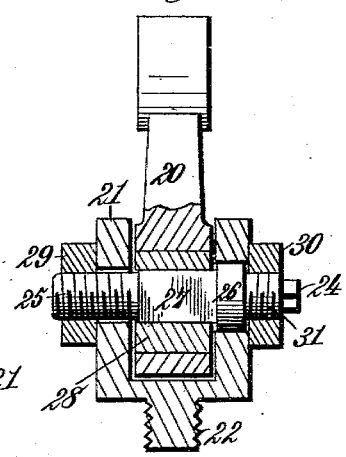
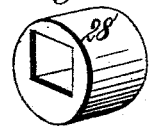
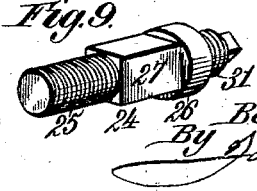
Witnesses.
Robert Emmett
Thos. A. Gunn
Inventor:
Benjamin C. Waite.
By James L. Norris.
Atty.

UNITED STATES PATENT OFFICE.

BENJAMIN C. WAITE, OF GENEVA, NEW YORK.

COMBINED FRICTIONAL AND POSITIVE CLUTCH.

SPECIFICATION forming part of Letters Patent No. 565,190, dated August 4, 1896.

Application filed November 15, 1895. Serial No. 569,069. (No model.)

*To all whom it may concern:*

Be it known that I, BENJAMIN C. WAITE, a citizen of the United States, residing at Geneva, in the county of Ontario and State of New York, have invented new and useful Improvements in a Combined Friction and Positive Clutch, of which the following is a specification.

The invention relates to a combined friction and positive clutch, and has for its object to provide in a clutch of the character described for driving-shafting, &c., improved mechanism operating by the continuous movement of a sleeve in one direction to first throw the friction-clutch into action to communicate a gradual initial movement to the driven shaft, and then throw the friction-clutch out of operation and the positive clutch into operation to drive the driven shaft positively.

It also has for its object to provide such a clutch with improved means for causing the coacting parts of the positive clutch to engage each other with certainty.

It has for its further object to provide improved means for taking up wear in the friction-clutch, and, finally, it has for its object to improve and simplify this class of clutches generally.

To these ends my invention consists in the features and in the construction or arrangement of parts hereinafter described, due reference being had to the accompanying drawings, forming a part of this specification, wherein—

Figure 1 is a vertical central section of my improved clutch. Fig. 2 is a cross-section taken on the line 2 2 of Fig. 1. Fig. 3 is a similar view on the line 3 3 of Fig. 1. Fig. 4 is an end view of the central portion of the inner face of the wheel 3, illustrating the jaws 32. Fig. 5 is a similar view of the sleeve 5, illustrating the jaws 33; and Figs. 6, 7, 8, and 9 are detail views illustrating the means for adjusting the throw of the links that actuate the friction-shoes.

Referring to the drawings, the numerals 1 and 2 indicate two separate shafts alined one with the other and having their adjacent ends arranged in close proximity. One of said shafts is adapted to be driven by any suitable power, while the other shaft is adapted to be caused to rotate in unison therewith by the mechanism hereinafter described.

To the shaft 2 is firmly keyed a wheel 3, having an annular peripheral flange 4, the inner periphery of which is shaped to correspond to the friction-shoes hereinafter described. Splined on the shaft 1 so as to revolve therewith, but capable of sliding longitudinally thereon, is a sleeve 5, that is provided at one end with an annular groove 6, in which is loosely fitted a sectional collar 7, provided with trunnions 8 for engagement by a shifting-lever in the usual manner. Surrounding the sleeve 5 is a sleeve 9, that abuts at one end against the wheel and is provided with an annular flange 10. An annulus 11 is fitted about the sleeve 9 and bears against the flange 10, and said annulus is fastened to the wheel 3 by bolts 12, that pass through suitable apertures formed in said annulus and are screwed into corresponding threaded apertures in the wheel 3, thus securing the sleeve 9 to the wheel, but permitting said wheel to rotate without rotating the sleeve.

The sleeve 9 is provided with an annular web 13, the periphery of which is provided at uniform distances apart with sockets 14, (in the drawings three such sockets are shown,) which are square or angular in cross-section. Fitted to slide in said sockets are thrust-blocks 15, of corresponding shape in cross-section, and provided at their outer ends with threaded lugs 16, over which are screwed segmental shoes 17, that are adapted to engage the inner periphery of the flange 4 of the wheel 3. The inner end of each of the thrust-blocks 15 is bifurcated or forked, and is perforated, as at 18, for the reception of a pivot-pin 19, which also passes through one end of a correspondingly-perforated link 20, which at its other end is pivotally secured, in the manner hereinafter described, to a forked lug 21, which is provided with a screw-threaded stud 22, that screws into a corresponding threaded aperture 23 in the sleeve. The lugs 21 are forked and perforated, as shown, in which forked ends are arranged the inner ends of the links 20. The said inner ends of the links 20 and the forked studs are pivotally and adjustably connected together as follows: The numeral 24 indicates a pin having a screw-threaded end 25, that engages one of the perforations in the lug 21, and is also provided with an annular collar 26, that fits within the other perforation in said lug. Intermediate the threaded portion 25 of the pin and the collar 26 is a squared portion 27, that fits within a similarly-shaped aperture formed in an eccentric 28, and said eccentric is fitted to freely turn in an aperture formed in the inner end of the link 20. A nut 29 engages the threaded end 25 of the pin 24, and a lock-nut 30 also engages a threaded portion 31 of said pin at the end opposite the threaded end 25.

The sleeve 9 is longitudinally slotted, as at 34, to permit the lugs 21 to slide back and forth with the sleeve 5, and the web 13 is provided with suitable apertures 35 to permit the free operation of the links 20, as will hereinafter appear. The shafts 1 and 2 are also adapted to be positively coupled together by a dog or jaw clutch constructed as follows: Upon the inner face of the hub of the wheel 3 are formed two jaws or projections 32, between which are adapted to fit corresponding jaws 33, formed on the adjacent end of the sleeve 5 in a manner well known.

For the purpose of lubricating the engaging faces of the wheel 3 and the annulus 11, I have shown a channel 11$^a$, formed between said parts, which is adapted to be supplied with oil through an opening 11$^b$, formed in the wheel.

The operation of my improved clutch is as follows: Either the shaft 1 or the shaft 2 may be the driven shaft, but for the sake of illustration let it be assumed that the shaft 2 is the constantly-running shaft and the shaft 1 is in a state of rest. To cause the two shafts to revolve together, the sleeve 5 is shifted toward the wheel 3, thus causing the links 20 to throw the thrust-blocks 15 radially outward and force the friction-shoes 17 against the inner periphery of the flange 4 of the wheel 3. As the shoes engage the flange 4 the shaft 1 is caused to gradually rotate with the shaft 2 until the links 20 assume positions at right angles to the shaft 1, when the friction-blocks will be at their extreme outward position and cause the shafts 2 and 1 to rotate in unison. In this position the shafts are caused to rotate together merely through the frictional engagement between the shoes 17 and wheel 3, and the jaws of the positive clutch are not in engagement, and may not be in the proper position relative one to the other for engagement. By moving the sleeve 5 still farther toward the wheel 3 the thrust-blocks are drawn radially inward and the shoes 17 drawn out of contact with the flange of the wheel 3, and the speed of the shaft 1 is thereby slightly reduced, so that the jaws of the friction-clutch are about to engage one another, and should they not be in the proper position for such engagement the slight slip or reduction of speed of the shaft 1 will bring the jaws in the proper position, and the continued movement of the sleeve 5 will cause them to engage one another and couple the shafts together positively.

It will be understood that when the shaft is heavily loaded a friction-clutch is liable to slip and that with the ordinary positive clutch it is impossible to throw the clutch into engagement when the shaft is running at a high rate of speed. By my improved combined friction and positive clutch the friction-clutch is first thrown into operation, so as to start the shaft up gradually, and when the two shafts are rotating in unison the positive clutch is then thrown into operation.

Having described my invention, what I claim is—

1. In a clutch of the class described the combination with the shafts 1 and 2, of the flanged wheel 3 keyed to the shaft 2 and provided with jaws 32, the sleeve 5 splined upon the shaft 1 and provided with jaws 33 adapted to interlock with the jaws 32 to form a positive clutch, radially-sliding thrust-blocks 15 carrying brake-shoes adapted to frictionally engage the wheel 3, links 20 pivoted at their inner ends to the sleeve 5 and at their outer ends to the thrust-blocks 15, and means for moving the sleeve longitudinally whereby the continuous movement of the sleeve in one direction operates to first thrust the brake-shoes into engagement with the wheel 3 and then retract said brake-shoes and force the jaws 32 and 33 into engagement, substantially as described.

2. In a clutch of the class described, the combination with the shafts 1 and 2, of the flanged wheel 3 keyed to the shaft 2 and provided upon its face with jaws 32, of the sleeve 5 splined upon the shaft 1 and provided with jaws 33 adapted to interlock with the jaws 32 to form a positive clutch, the sleeve 9 encircling the sleeve 5 and swiveled to the wheel 3, and provided with an annular web 13, thrust-blocks 15 arranged to slide radially in sockets formed in the periphery of said web and carrying at their outer ends friction-shoes 17 adapted to engage the flange of the wheel 3, and links 20 pivotally connected at their inner ends to the sleeve 5 and at their outer ends to the thrust-blocks 15, the arrangement being such that as the sleeve 5 is moved toward the wheel 3, the friction-shoes are first caused to engage the flange of said wheel and are then withdrawn from such engagement and the jaws 32 are thrown into engagement, substantially as described.

3. In a clutch of the class described, the combination with the shafts 1 and 2, of the flanged wheel 3 keyed to the shaft 2 and provided upon its face with jaws 32, of the sleeve 5 splined upon the shaft 1 and provided upon one end with jaws 33 adapted to interlock with the jaws 32 to form a positive clutch, the sleeve 9 encircling the sleeve 5 and swiveled at one end to the wheel 3 and provided with an annular web 13, thrust-blocks 15 angular in cross-section and arranged to slide radially in correspondingly-shaped sockets 14 formed in the periphery of said web and carrying at their outer ends segmental friction-shoes 17 adapted to engage the flange of the wheel 3, lugs 21 attached to the sleeve 5 and adapted to travel in longitudinal slots 34 in the sleeve 9, and links 20 pivotally secured at their inner ends to the lugs 20 and at their outer ends to the thrust-blocks 15, substantially as described.

4. In a clutch of the character described, the combination with the shafts 1 and 2, of the flanged wheel 3 keyed to the shaft 2 and provided upon its face with jaws 32, the sleeve 5 splined upon the shaft 1 and provided upon one end with jaws 33 adapted to interlock with the jaws 32 to form a positive clutch, the longitudinally-slotted sleeve 9 encircling the sleeve 5 and provided at one end with a flange 10, an annulus 11 bearing against the flange 10 and bolted to the wheel 3, an annular web 13 formed on the sleeve 9 and provided upon its periphery with sockets 14, thrust-blocks 15 arranged to slide radially in said sockets and provided at their outer ends with segmental friction-shoes 17 adapted to engage the flange of the wheel 3, lugs 21 attached to the sleeve 5 and adapted to travel in the slots in the sleeve 9, links 20 pivotally attached at their inner ends to the lugs 21 and at their outer ends to the thrust-blocks 15, and means for adjusting the throw of said links, substantially as and for the purpose specified.

5. In a clutch of the character described, the combination with the shafts 1 and 2, of the flanged wheel 3 keyed to the shaft 2, the sleeve 5 splined upon the shaft 1 and carrying the forked lugs 21, the longitudinally-slotted sleeve 9 encircling the sleeve 5 and swiveled on the wheel 3 and provided with an annular web 13 having sockets 14 formed in its periphery, thrust-blocks 15 arranged to slide radially in said sockets, links 20 pivotally connected at their outer ends to said thrust-blocks, an eccentric 28 journaled in the inner end of each of said links and provided with an angular aperture, pin 24 journaled in each of the lugs 21 and having a similarly-shaped angular portion fitted in said aperture and screw-threaded at its opposite ends, nuts 29 and 30 for engaging said threaded ends for preventing rotation of the pin, and means for turning the pin, substantially as and for the purpose specified.

In testimony whereof I have hereunto set my hand in presence of two subscribing witnesses.

BENJAMIN C. WAITE.

Witnesses:
ALEXANDER DIENST,
HENRY Z. DEZBERG, Jr.